UNITED STATES PATENT OFFICE.

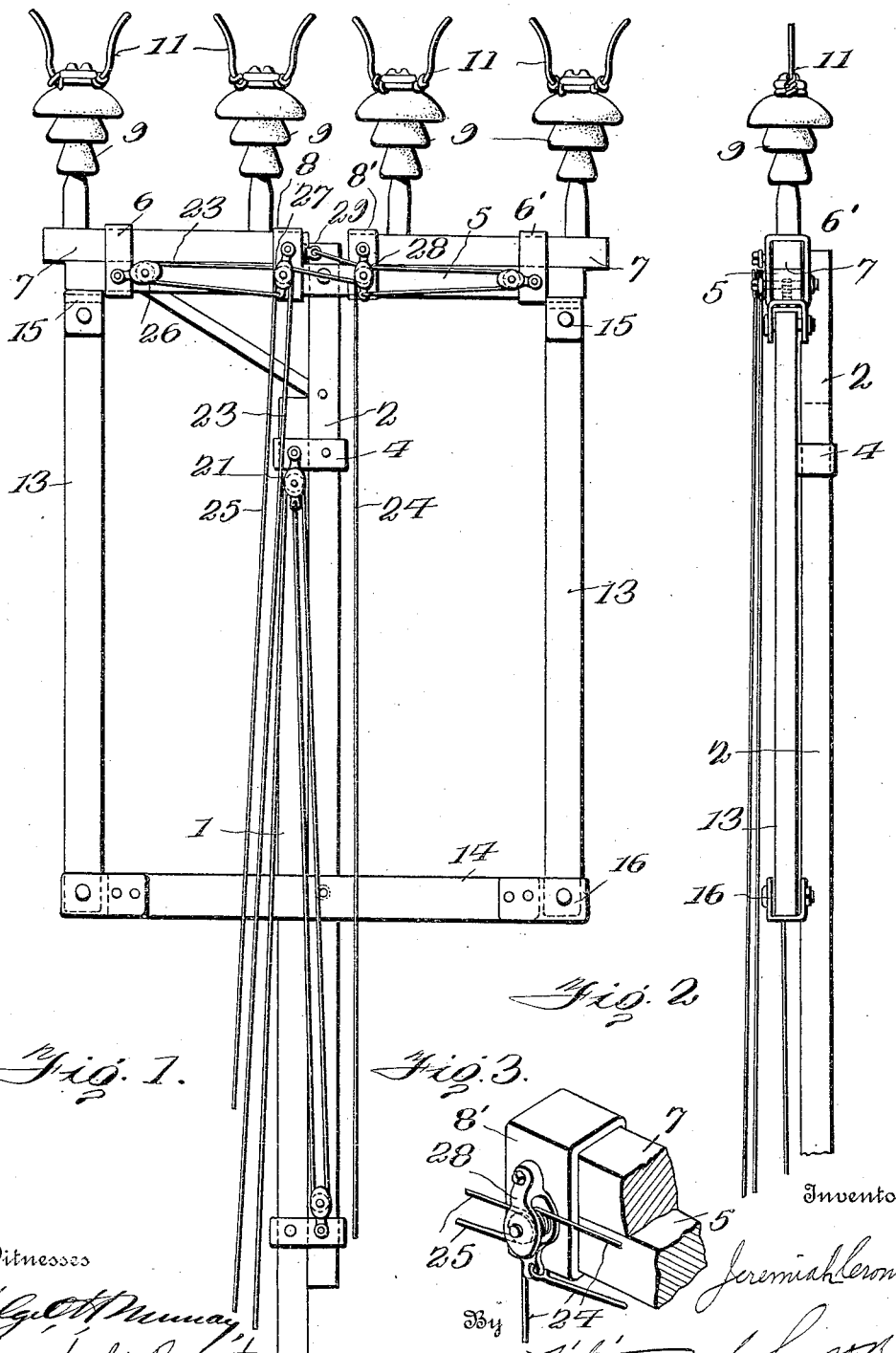

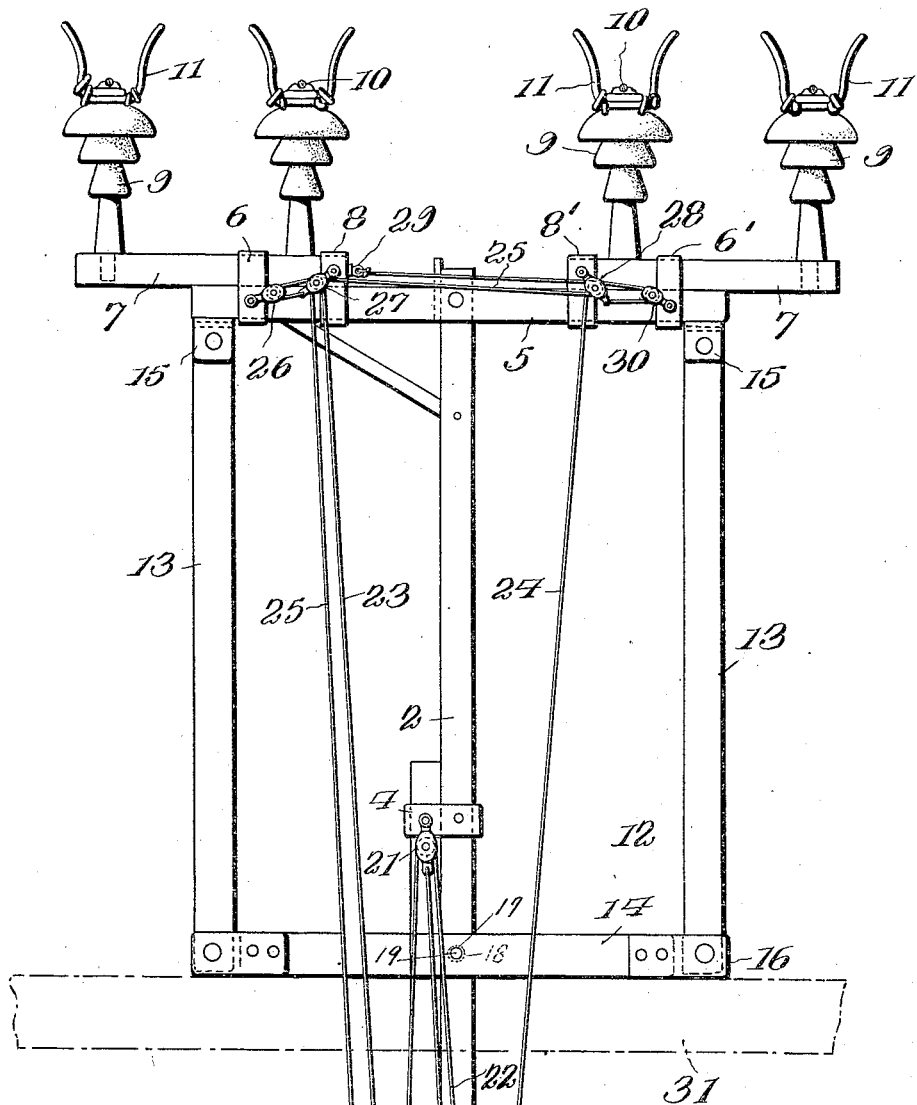

JEREMIAH CRONIN, OF WAPAKONETA, OHIO, ASSIGNOR TO THE CRONIN ELECTRICAL APPLIANCES COMPANY, OF WAPAKONETA, OHIO.

IMPLEMENT FOR INSTALLING AND REPAIRING ELECTRIC CONDUCTORS.

1,050,004. Specification of Letters Patent. Patented Jan. 7, 1913.

Application filed May 13, 1912. Serial No. 697,101.

*To all whom it may concern:*

Be it known that I, JEREMIAH CRONIN, a citizen of the United States, residing at Wapakoneta, in the county of Auglaize and State of Ohio, have invented certain new and useful Improvements in Implements for Installing and Repairing Electric Conductors, of which the following is a specification.

This invention relates to an implement for installing and repairing line-wires of high voltage.

The primary object of the invention is to provide a tool adapted for use in installing and repairing wires of high potential, while the current or power is on such wires, thus making it possible to make installations and repairs without interfering with traffic. Heretofore, so far as I am aware, repairs on such lines are usually made at night, or at a time when the current is cut off. The implement about to be described, is one of a number which I employ for making repairs on high voltage lines, and it is designed for the purpose of raising the phase wires above the workmen to a safe distance, giving the workmen an opportunity to seat the cross-arms, insulators and other attachments for the poles, which later receive the wires and hold them permanently.

The implement embodies a construction which adapts it to be adjusted laterally to temporarily receive and raise phase wires of varying distances apart, all of which will be more fully described in the following specification.

Other objects and advantages of the device, than those stated, will become apparent in the course of the following description.

In the drawings—Figure 1 is a side elevation of the implement, showing the insulator-carrying-arms in normal position; Fig. 2 is an edge elevation of the implement; Fig. 3 is a detail broken perspective showing one of the bands and pulleys for effecting the lateral adjustment of the insulator carrying arms; and Fig. 4 is an elevation showing the insulator carrying arms extended or in one of their lateral adjustments, there being also shown in dotted lines, one of the cross-arms of a pole, which aids in supporting the upper member of the implement, when it has been brought to its uppermost position.

Referring to the drawings, the numeral 1 designates the fixed rod. That is to say a rod which in using the implement, or what we term the "strong man" is always used from a fixed point or station.

The numeral 2 designates the upper movable rod and both rods are preferably rectangular in cross section, so as to be more readily guided and prevented from turning. The rod 1 is provided with a guide 4 which is permanently fixed to the rod, and rod 2 carries a similar guide 3 permanently fixed to said rod 2, thus rendering rod 2 capable of sliding adjustment on rod 1, enabling the upper member of the implement to be raised or lowered by a means which will be described presently. The rod 2 carries at its upper end a cross arm 5 to which is attached at each end a guide 6.

The numeral 7 designates two laterally extending arms which are laterally adjustable with relation to the arm 5. These arms carry at their inner ends guides 8 and 8' and mounted on the arm 7 are petticoat insulators 9 having the usual transverse recesses 10 in their upper ends to receive the phase wires. Secured to the insulators by twisting together or otherwise, are upwardly extending yokes 11 which serve to center the phase wires and keep them always in engagement with the insulators in all of the points of vertical adjustment.

The numeral 12 designates a rectangular support formed of two side pieces 13 and a base or cross piece 14. Side pieces are pivoted securely to two depending brackets 15, firmly secured to the underside of cross arm 5 at or near its outer ends. The cross arm 14 is provided with laterally extending ears 16, presenting a bifurcation between which ears or bifurcated ends the arms 13 are pivoted, thus rendering the cross piece capable of a swinging movement. Preferably the arm 14 is provided with an aperture 17 and another aperture 18 is provided in the rod 2 for the passage of a pin 19 by which the rectangular support 12 may be firmly held when desired. The means for raising the upper member of the implement and the means for extending and retracting the insulator-carrying arms, consists of a system of pulleys and cords which will now be described.

Secured to guide 3 is a pulley 20 and secured to guide 4 is a pulley 21, said pulleys 20 and 21 may be attached to hooks or ring bolts secured to the guides 3 and 4. A cord 22 has one end attached to the pulley 21 and the cord passes over the pulley 20 and then passes over the pulley 21 and downwardly in position to be grasped by the workmen or operator, and which cord may be attached to a cleat or other device on fixed rod 1 when the proper adjustment of the implement members has been accomplished. By this cord it will be readily seen that the upper member of the implement may be adjusted with regard to the lower rod, the upper rod 2 sliding through the guide 4 and being guided on the rod 1 by the guide 3. This is for the adjustment of the upper and lower parts of the implement with relation to each other. The pulleys 20 and 21 may be either single sheaved or double sheaved. Now where it is required and desired to laterally adjust the arms 7 with relation to the cross arm 5 carried by the member 2, the cords 23, 24 and 25 are manipulated as the exigencies of the case may require. To the guide is attached a pulley 26, and attached to the guide 8 is a double sheaved pulley 27, and secured to the pulley 27 is the cord 23, which passes over the pulley 26, and then over the pulley 27 and downward to a convenient point to be grasped by the operator.

Attached to the guide 8' is a double sheaved pulley 28, and attached to the guide 6' is a pulley 30 and to pulley 28 is attached the cord 24, which passes over the pulley 30, and over one of the sheaves of the pulley 28 and down below the implement.

Attached to one of the sliding arms 7 is an eye 29, and the upper end of cord 25 may be attached to said eye 29, or to the double sheaved pulley 27, and this cord passes over one of the sheaves in pulley 28, and then over one of the sheaves in pulley 27, down to a convenient place for the workmen. All of the cords after the proper adjustment has been obtained, may be securely fastened to a cleat or other device in order to maintain the desired adjustment.

In operation, as has already been suggested, the rod 1 is firmly secured to a pole, either a new pole that is to be repaired in the way of providing it with new insulators, or other necessary devices and where it will become necessary and advisable to raise the phase wires out of the way of the workmen while they are engaged in placing new cross arms upon a new pole or making other desired repairs. The cord 22 is manipulated to raise the upper member of the implement and when it is raised to the desired extent, the cord may be fastened, or the cross piece 14 of the support 12 may be raised upon one of the cross arms of the line pole 31 shown in dotted lines, Fig. 4, which obviously will hold the upper part of the implement in properly raised position. By manipulating cords 23 and 24, the adjustable arm 7 may be moved to the limit of their lateral adjustment as shown in Fig. 4, and the cord 25 may be manipulated to draw the arms together or to the position shown in Fig. 1. The upper member of the implement after the phase wires have been united by suitable devices is raised until the insulators engage the various phase wires between the yokes 10, when the upper part of the implement is further raised to support the wires at a very considerable distance above the point where they will ultimately rest when the job is completed. When the work is completed and the insulators upon the permanent road pole are in position to receive the phase wires, the upper part of the device is lowered bringing the wires to their proper positions upon a permanent pole insulator, when the implement may be dispensed with, the job being completed when the wires are properly fastened to their respective permanent insulators.

From the foregoing it will be seen that the implement described may be conveniently employed to raise high potential wires or phase wires very considerably beyond the point where the workmen in fixing the pole below, will be entirely out of danger, and it will be understood that many modifications involving mechanical skill may be employed without departing from the spirit of the invention.

I may dispense with the lateral arm 7, providing a device for use in connection with a line where the phase wires are of uniform distance apart, in which event lateral adjustment of the insulator devices would not be required. This would dispense with the cords 23, 24 and 25 and the insulators, and insulator pins would be attached directly to the cross arm 5.

Having thus described my invention, what I claim is:

1. An implement for manipulating line wires, comprising a rectangular frame mounted on a slidable rod or pole, laterally-adjustable arms carried by said frame, insulating devices carried by said arms, and means for raising and lowering the slidable rod or pole and thereby the frame and insulating devices.

2. An implement of the character described, comprising a fixed member, a vertically adjustable member, adapted to slide with relation to the fixed member, the adjustable member being provided with a cross-arm, laterally adjustable arms supported and guided upon the cross-arm and insulator means carried by the adjustable arms adapted to temporarily support the phase wires, and means for extending and retracting the adjustable arm.

3. An implement for manipulating line wires, comprising a rectangular frame mounted on a slidable rod or pole, laterally-adjustable arms carried by said frame, insulating devices carried by said arms, means for raising and lowering said rod or pole and thereby the frame and arms, and means for moving the arms laterally.

4. An implement of the character described, comprising a fixed member, a sliding rod, capable of vertical adjustment with relation to the fixed member, a cross-arm attached to the sliding rod, laterally adjustable arms supported upon and guided in relation to the cross-arm, and pulleys and cords for extending and retracting the cross-arms, insulator means carried by the adjustable arms, guide devices on the insulator devices for preventing any considerable lateral movement of the phase wires, in the raising operation of said wires, and means for extending and retracting the laterally adjustable arms.

5. An implement for manipulating line wires, comprising a rectangular frame mounted on a slidable rod or pole, the side pieces of said frame being pivotally connected to the top and bottom bars of the frame, laterally-adjustable arms carried by said top bar, means for vertically moving the frame, and means for moving the arms laterally.

6. An implement of the character described, comprising a fixed member, a member adapted to slide with relation to the fixed member and for vertical adjustment with relation thereto, a cross-arm, secured to the sliding member, insulator devices carried by the cross-arm, a support secured to the cross-arm and adapted to rest upon a fixed portion of the line pole, to keep the upper member of the implement in upper adjusted position.

In testimony whereof I affix my signature in presence of two witnesses.

JEREMIAH CRONIN.

Witnesses:
R. B. ANDERSON,
E. C. RIDDLE.

Copies of this patent may be obtained for five cents each, by addressing the "Commissioner of Patents, Washington, D. C."